UNITED STATES PATENT OFFICE.

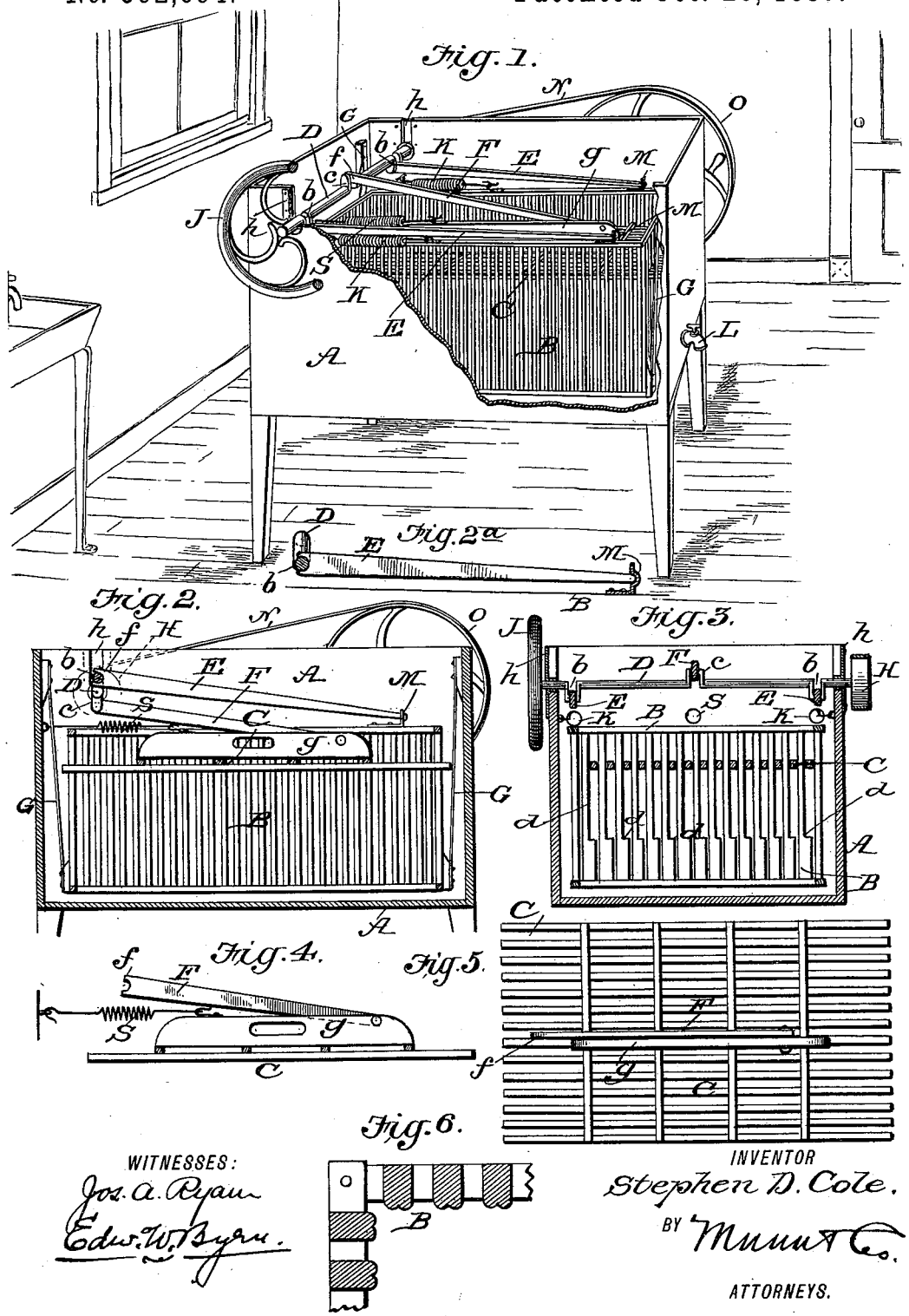
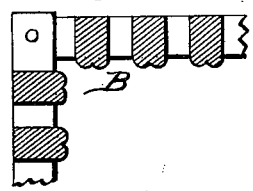

STEPHEN D. COLE, OF WALLACE, IDAHO.

WASHING-MACHINE.

SPECIFICATION forming part of Letters Patent No. 592,694, dated October 26, 1897.

Application filed May 28, 1897. Serial No. 638,528. (No model.)

*To all whom it may concern:*

Be it known that I, STEPHEN D. COLE, of Wallace, in the county of Shoshone and State of Idaho, have invented a new and useful Improvement in Washing-Machines, of which the following is a specification.

My invention is in the nature of an improved washing-machine for washing clothes in a thorough and expeditious manner in a short space of time and without any tearing or destructive strains on the fabric; and it consists, chiefly, in a vibrating cage or basket immersed within the water in a tank, combined with a slatted and vibrating lid or follower arranged to bear upon the top of the clothes in the cage and having an opposite movement from the cage, as will be hereinafter more fully described with reference to the drawings, in which—

Figure 1 is a perspective view of my machine with a part of the outer tank broken away to show the cage within. Fig. 2 is a vertical longitudinal section. Fig. 2ᵃ is an enlarged detail view of one of the pitmen E shown in relation to the crank-shaft and the socket-plate M. Fig. 3 is a vertical transverse section. Figs. 4 and 5 are side and top views of the slatted lid or follower; and Fig. 6 is a detail in horizontal section of one corner of the cage, showing the form of the slats.

In the drawings, A represents a rectangular water-tight tank or casing of suitable size, somewhat longer than it is wide, mounted upon legs and provided with a drainage-cock L. Within this tank there is suspended upon spring-hangers G at the ends a slatted cage or basket B, conforming in general shape to the tank, but somewhat smaller than the same, so as to leave an open space around it on all sides and also under the bottom. The space around its sides allows of the horizontal reciprocation of the cage upon its hangers, while the space at the bottom keeps the clothes out of contact with any sediment or dirt in the bottom of the tank.

The cage is made of slats beaded on the inner sides, as shown in Fig. 6, so as not to tear the clothes, and the side and end slats run vertically. Those on the end (see Fig. 3) are thinner at the top than they are at the bottom, leaving shoulders $d$, which cause the slats to have larger spaces between their upper portions than there is between their lower portions.

Within the cage there loosely fits a slatted lid or follower C. The slats of this lid are arranged longitudinally and are connected by suitable cross-pieces, and said longitudinal slats are longer than the length of the cage, and the slats are of such size and spacing as to pass through the spaces between the slats at the ends of the cage, as shown in Figs. 1 and 2, and work freely through the same with a longitudinal reciprocation. The shoulders $d$ on the end slats form a support to sustain the slats of the lid and prevent it from dropping down to the bottom of the cage when the latter is empty.

Within the upper edges of the side walls of the tank near one end there are formed slots, which are closed by journal-plates $h$, having Babbitt-metal bearings, in which is journaled a transverse crank-shaft D, having upon one end a fly-wheel J and upon the other a small band-pulley H, driven by a belt N from a larger hand-crank pulley O. This crank-shaft has near its ends within the tank two double cranks $b\ b$ and near the middle another double crank $c$, which extends from the center of the shaft in an opposite direction from the cranks $b\ b$. The cranks $b\ b$ fit within the forked ends of pitmen E E, whose opposite ends are received within socket-plates M M on the upper edge of the cage. These pitmen E E are thus made easily detachable, as one end of each is simply seated in the concave bearing in one side of the socket-plate M, while the other forked end embraces the crank-shaft, the pitmen being held in place against falling out by the end thrust put upon them by the springs K. The crank $c$ fits within the forked end $f$ of a pitman F, (see Fig. 4,) whose opposite end is jointed to a cleat $g$ on the top of the lid or follower C.

K are spiral springs, one end fastened to the cage and the other to the tank, to return the cage B after being thrust forward by the pitmen E, and S is a spiral spring, one end fastened to the tank and the other to the cleat $g$ of the lid, to return the latter after being thrust forward by the pitman F. Now when the crank-shaft D revolves it will be seen that a longitudinal reciprocation is imparted to the cage B as it is suspended upon its hangers, while an opposite reciprocation is imparted to the lid or follower C, which rests upon the top of the clothes, the ends of the slats of the lid playing freely through the spaces between the slats of the ends of the cage. This reciprocation is very rapid, the multiplication of the revolutions of shaft D by the different-sized pulleys O and H amounting to about three or four hundred per minute. This causes a violent agitation of the water and a rubbing of the clothes from all sides and also the top, causing the clothes to be washed very quickly. The clothes should not be packed tightly in the cage, and are held in a state of suspension in the water, so as to be thrown about with a short quick jerking action that causes a very efficient cleansing action without any destructive strains or wearing abrasive action.

To remove the clothes, the crank-shaft D is turned to a position that moves the cage to its extreme throw in one direction, while the lid is drawn in the opposite direction and the spring S is unhooked. In this position the lid C may be forced still farther back through the slats of the cage until the forked end $f$ of the pitman F is dislodged from the crank-shaft and the lid is then taken out one end at a time by the handhold in the cleat $g$.

Having thus described my invention, what I claim as new, and desire to secure by Letters Patent, is—

1. A washing-machine, comprising a tank or case, an open cage suspended within the tank for horizontal reciprocation and having vertically-slatted ends, a slatted follower of greater length than the cage adapted to rest upon the top of the clothes in the cage and having its slats protruding through the spaces between the end slats of the cage, and means for imparting an opposite reciprocation to the cage and its follower substantially as and for the purposes described.

2. A washing-machine consisting of a tank, a suspended cage therein having vertical end slats with shoulders $d$ near their lower ends, a slatted follower arranged within the cage and having its slats protruding between the end slats of the cage and adapted to rest, when the cage is empty, upon the shoulders $d$, and means for reciprocating the cage and follower substantially as and for the purpose described.

3. A washing-machine consisting of a tank, a slatted cage B with hangers G for suspending it within the tank, the slatted follower C, a crank-shaft D connected by pitmen to the cage and also to the follower for opposite reciprocation, and springs K and S for bringing back the said cage and follower after having been advanced by the pitmen substantially as and for the purpose described.

4. In a washing-machine, the combination with the tank and the suspended cage; of a crank-shaft arranged in the tank, a socket-plate M secured to the cage, and a detachable pitman E having a fork or slot at one end embracing the crank of the shaft and having its other end seated in the socket-plate, and a spring for returning the cage substantially as and for the purpose described.

STEPHEN D. COLE.

Witnesses:
JOHN M. FINN,
TOM HENEY.